United States Patent
Chu

(10) Patent No.: US 9,992,149 B2
(45) Date of Patent: Jun. 5, 2018

(54) TWO-WAY MESSAGE SERVICE AND VOICE COMMUNICATION

(75) Inventor: Enlai Chu, San Mateo, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 172 days.

(21) Appl. No.: 13/485,664

(22) Filed: May 31, 2012

(65) Prior Publication Data

US 2013/0325973 A1 Dec. 5, 2013

(51) Int. Cl.
*G06F 15/16* (2006.01)
*H04L 12/58* (2006.01)
*H04M 3/42* (2006.01)
*H04L 29/12* (2006.01)

(52) U.S. Cl.
CPC ............ *H04L 51/28* (2013.01); *H04L 51/16* (2013.01); *H04M 3/42059* (2013.01); *H04M 3/42382* (2013.01); *H04L 61/2596* (2013.01); *H04L 61/605* (2013.01)

(58) Field of Classification Search
CPC .. H04L 65/1016; H04L 65/40; H04L 12/5865
USPC ................. 709/206; 455/411, 413, 433, 466; 370/338, 349, 352
See application file for complete search history.

(56) References Cited

U.S. PATENT DOCUMENTS

| 7,894,842 B2 | 2/2011 | Jagoe et al. | |
| 2004/0180676 A1* | 9/2004 | Haumont et al. | 455/461 |
| 2006/0182243 A1* | 8/2006 | Yun | 379/114.1 |
| 2006/0205404 A1* | 9/2006 | Gonen et al. | 455/432.1 |
| 2007/0121863 A1 | 3/2007 | Nagel et al. | |
| 2007/0177568 A1* | 8/2007 | Clontz et al. | 370/349 |
| 2007/0220092 A1* | 9/2007 | Heitzeberg et al. | 709/204 |
| 2009/0075680 A1 | 3/2009 | Carroll | |
| 2010/0069095 A1* | 3/2010 | Yahav et al. | 455/466 |
| 2010/0141445 A1 | 6/2010 | Venkatasubramaniyam et al. | |

(Continued)

FOREIGN PATENT DOCUMENTS

| CN | 1419394 | 5/2003 |
| CN | 1518372 | 8/2004 |

(Continued)

OTHER PUBLICATIONS

"International Search Report", dated Jul. 5, 2013, Application No. PCT/US2013/041484, Filed Date: May 17, 2013, pp. 10.

(Continued)

*Primary Examiner* — Hitesh Patel

(57) ABSTRACT

Various embodiments support two-way message service and voice communication. In at least some embodiments, temporary numbers from a pool of numbers are automatically assigned to outgoing messages and grouped with the intended recipient's phone number. Recipients can reply to the message by replying to the assigned number and the reply will be sent back to the originator of the message. In at least some embodiments, the pool of numbers includes different types of numbers such as, by way of example and not limitation, shared numbers and dedicated numbers. Further, at least some embodiments can utilize various policies in order to determine how to automatically assign temporary numbers. Such policies can be driven by business rules, regulatory concerns, carrier-based considerations, and the like.

20 Claims, 9 Drawing Sheets

(56) References Cited

U.S. PATENT DOCUMENTS

| | | | |
|---|---|---|---|
| 2010/0203909 A1* | 8/2010 | Oldach | G06Q 10/10 455/466 |
| 2010/0311444 A1 | 12/2010 | Shi et al. | |
| 2011/0007750 A1* | 1/2011 | Puzon | 370/401 |
| 2011/0053580 A1 | 3/2011 | Gutierrez et al. | |
| 2011/0292930 A1 | 12/2011 | Mobin et al. | |
| 2011/0294472 A1* | 12/2011 | Bramwell et al. | 455/413 |
| 2012/0059922 A1 | 3/2012 | Jason et al. | |
| 2013/0109350 A1* | 5/2013 | Skelton et al. | 455/411 |

FOREIGN PATENT DOCUMENTS

| | | |
|---|---|---|
| CN | 101159778 | 4/2008 |
| CN | 101304598 | 11/2008 |
| WO | 98/58476 A1 | 12/1998 |
| WO | 03/096652 A2 | 11/2003 |

OTHER PUBLICATIONS

"Two-Way Text Messaging—SMS Reply Service", Retrieved at <<http://www.textmagic.com/app/pages/en/products/2-way-sms-service>>, Retrieved Date: May 18, 2012, pp. 3.

"Foreign Office Action", CN Application No. 201380040708.3, dated May 4, 2016, 13 pages.

"Foreign Office Action", CN Application No. 201380040708.3, dated Nov. 16, 2016, 16 pages.

"Office Action Issued in European Patent Application No. 13725528.7", dated Sep. 7, 2017, 5 Pages.

\* cited by examiner

TWO-WAY MESSAGE SERVICE AND VOICE COMMUNICATION

BACKGROUND

As communication networks grow and scale, challenges continue to face those who design communication systems to design efficient and reliable systems that provide a desirable user experience.

SUMMARY

This Summary is provided to introduce a selection of concepts in a simplified form that are further described below in the Detailed Description. This Summary is not intended to identify key features or essential features of the claimed subject matter.

Various embodiments support two-way message service and voice communication. In at least some embodiments, temporary numbers from a pool of numbers are automatically assigned to outgoing messages and grouped with the intended recipient's phone number. Recipients can reply to the message by replying to the assigned number and the reply will be sent back to the originator of the message. In at least some embodiments, the pool of numbers includes different types of numbers such as, by way of example and not limitation, shared numbers and dedicated numbers. Further, at least some embodiments can utilize various policies in order to determine how to automatically assign temporary numbers. Such policies can be driven by business rules, regulatory concerns, carrier-based considerations, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Various embodiments support two-way message service and voice communication. In at least some embodiments, temporary numbers from a pool of numbers are automatically assigned to outgoing messages and grouped with the intended recipient's phone number. Recipients can reply to the message by replying to the assigned number and the reply will be sent back to the originator of the message. In at least some embodiments, the pool of numbers includes different types of numbers such as, by way of example and not limitation, shared numbers and dedicated numbers. Further, at least some embodiments can utilize various policies in order to determine how to automatically assign temporary numbers. Such policies can be driven by business rules, regulatory concerns, carrier-based considerations, and the like. The policies are configurable in order to support goals that include usability of the service by providing local numbers for replies, compliance with regulatory requirements, reduction of costs associated with each phone number, and load-balancing to increase the success rates of messages being sent and received.

In at least some embodiments, the techniques described herein can be applied to group message scenarios which may involve users in different countries. Each member of the group can reply to a number that is local to him or her. A dedicated number for each country represented by the group members' phone numbers can be used to send messages to the group, or each group member can be independently assigned a local shared number.

In at least some embodiments, the techniques described herein can be applied, in a similar way, to routing voice calls to the correct user. In the same way that message replies are routed from the recipient to the originator of the message, inbound voice calls from the recipient to the assigned shared or dedicated number can be routed to a caller's client or forwarded to a user's PSTN number of choice.

In at least some embodiments, users are given an option to choose between having replies sent back to a mobile number of choice or to an IP-based application. In the former approach, outbound text messages are sent with a sender ID of the user's mobile number of choice. In the latter approach, messages are sent with the sender ID of a phone number managed by a service which, in turn, will receive the replies and relay them back to the user.

In the following discussion, an example environment is first described that is operable to employ the techniques described herein. Example illustrations are then described, which may be employed in the example environment, as well as in other environments.

Example Environment

Figure 1:
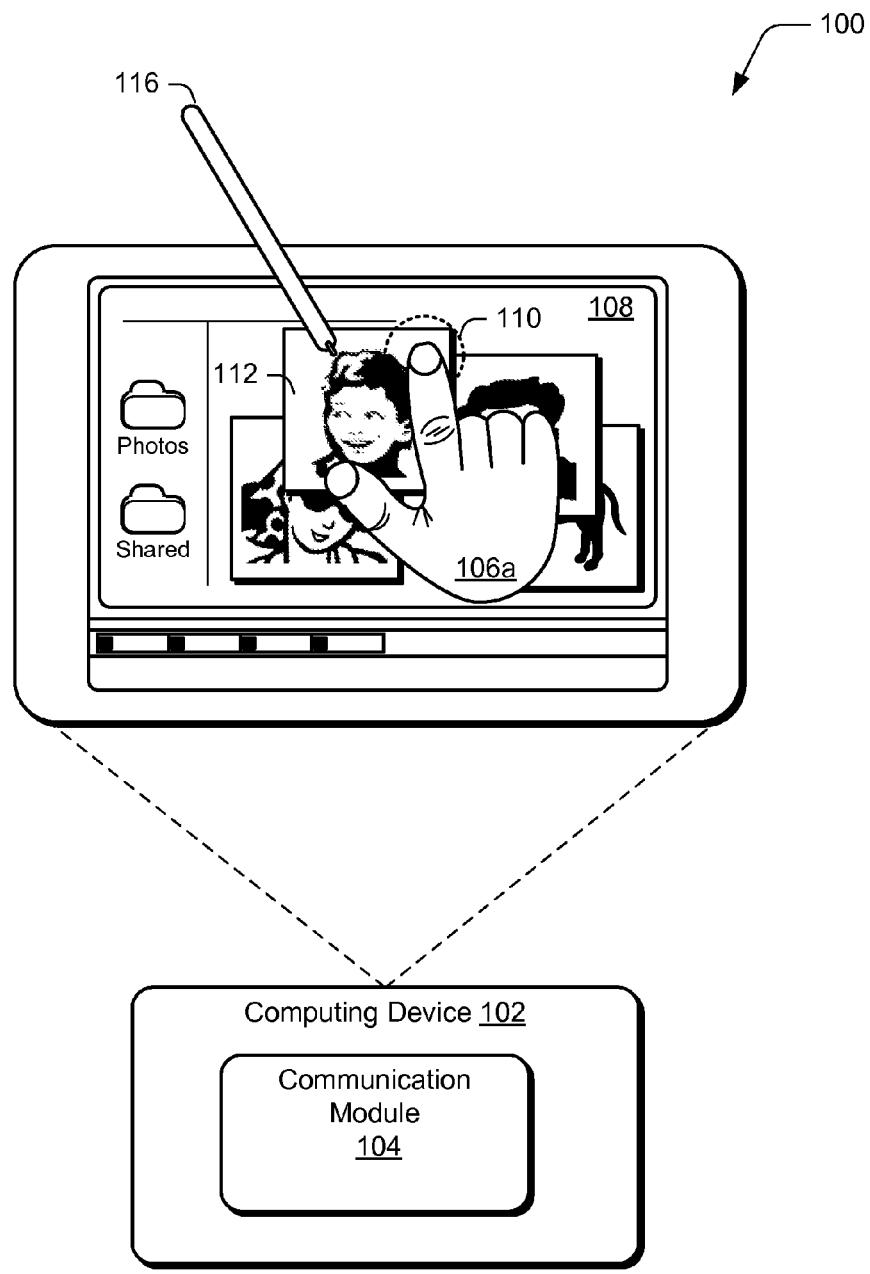
FIG. 1 is an illustration of an environment in an example implementation in accordance with one or more embodiments.

FIG. 1 is an illustration of an environment 100 in an example implementation that is operable to employ the techniques described herein. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 also includes software that causes the computing device 102 to perform one or more operations as described below.

Computing device 102 includes a communication module 104 that can be configured in a variety of ways. For example, the communication module 104 can be configured to enable various message service messages, such as Short Message Service (SMS) messages and Multimedia Messaging Service (MMS) messages to be sent and received by computing device 102. SMS is a text messaging service component of phone, web, or mobile communication systems using standardized communications protocols that allow the exchange of short text messages between fixed line or mobile phone devices. MMS is a service component that provides a standard way to send messages that include multimedia content to and from devices and extends the SMS capability.

The messages can be sent and received between mobile phone devices and/or computing devices using standard protocols including, by way of example and not limitation, Signaling System 7 (SS7), Internet Protocol (IP), and the like. The messages can be sent from the computing device to other computing devices in the same or different country.

Alternately or additionally, the communication module 104 can be configured to enable Voice over Internet Protocol (VoIP) service with other computing devices. This service allows users to communicate by voice, video, and instant messaging over the Internet.

Messaging and VoIP services can be implemented using the techniques described herein.

The computing device can also be enabled to recognize gestures using a suitably configured gesture module. The gesture module can be implemented in connection with any suitable type of hardware, software, firmware or combination thereof. In at least some embodiments, the gesture module is implemented in software that resides on some type of tangible, computer-readable medium, examples of which are provided below.

The gestures may be recognized in a variety of different ways. For example, the gesture module may be configured to recognize a touch input, such as a finger of a user's hand 106a as proximal to or touching display device 108 of the computing device 102 using touchscreen or near field functionality.

In the illustrated example, a finger of the user's hand 106a is illustrated as selecting 110 an image 112 displayed by the display device 108. Selection 110 of the image 112 and subsequent movement of the finger of the user's hand 106a may be recognized by the gesture module 104. The gesture module 104 may then identify this recognized movement as indicating a "drag and drop" operation to change a location of the image 112 to a point in the display at which the finger of the user's hand 106a was lifted away from the display device 108. Thus, recognition of the touch input that describes selection of the image, movement of the selection point to another location, and then lifting of the finger of the user's hand 106a may be used to identify a gesture (e.g., drag-and-drop gesture) that is to initiate the drag-and-drop operation.

A variety of different types of gestures may be recognized by the gesture modules 104, 105 such as gestures that are recognized from a single type of input (e.g., touch gestures such as the previously described drag-and-drop gesture, forward swipe gestures, and the like) as well as gestures involving multiple types of inputs. For example, the gesture module can be utilized to recognize single-finger gestures and bezel gestures, multiple-finger/same-hand gestures and bezel gestures, and/or multiple-finger/different-hand gestures and bezel gestures.

For example, the computing device 102 may be configured to detect and differentiate between a touch input (e.g., provided by one or more fingers of the user's hand 106a) and a stylus input (e.g., provided by a stylus 116). The differentiation may be performed in a variety of ways, such as by detecting an amount of the display device 108 that is contacted by the finger of the user's hand 106 versus an amount of the display device 108 that is contacted by the stylus 116.

Figure 2:
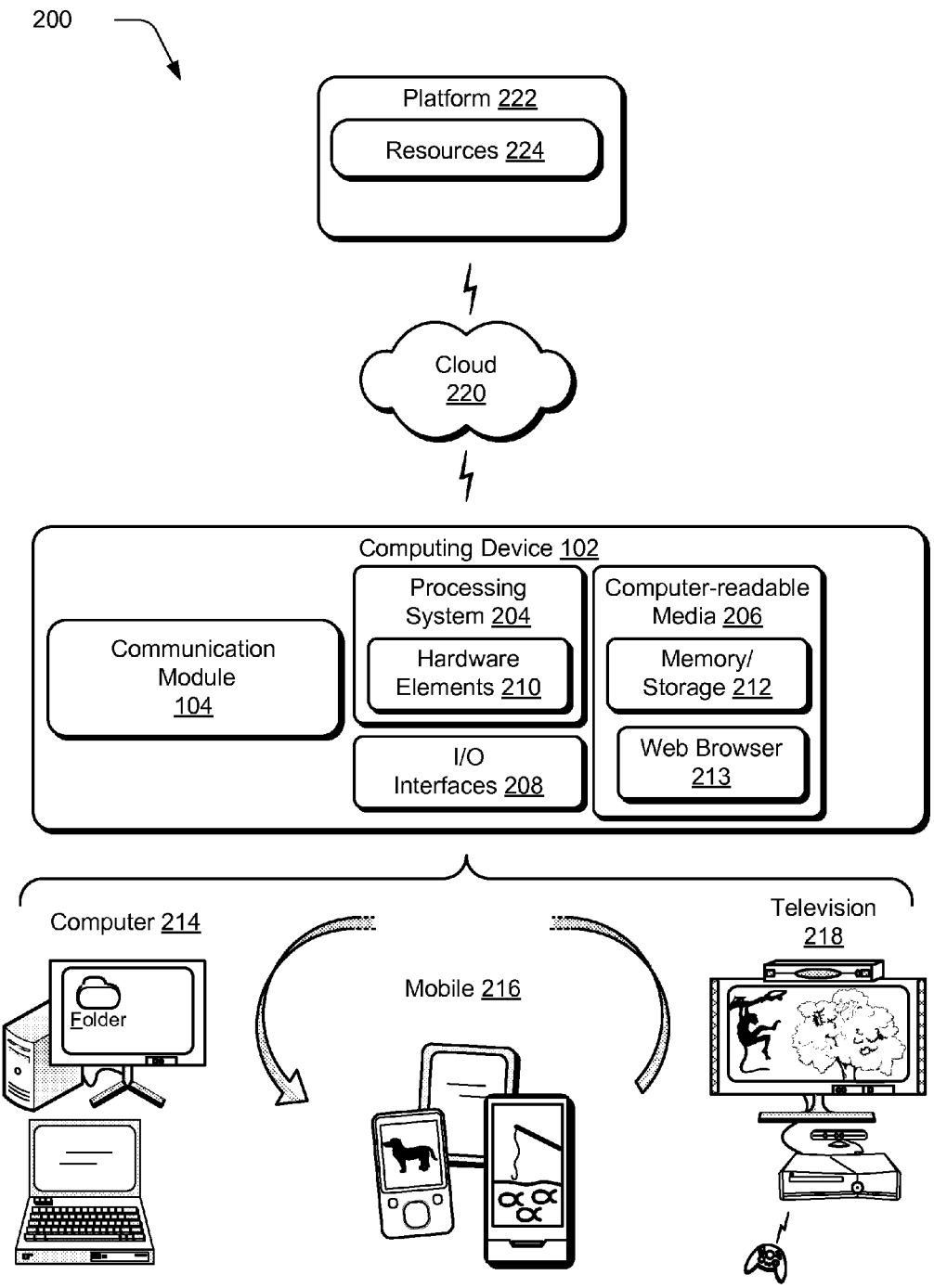
FIG. 2 is an illustration of a system in an example implementation showing FIG. 1 in greater detail.

FIG. 2 illustrates an example system generally at 200 that includes an example computing device 102 that is representative of one or more computing systems and/or devices that may implement the various techniques described herein. The computing device 102 may be, for example, a server of a service provider, a device associated with a client (e.g., a client device), an on-chip system, and/or any other suitable computing device or computing system. Computing device 102 includes communication module 104 as described above. The computing device 102 also includes a processing system 204, one or more computer-readable media 206, and one or more I/O interface 208 that are communicatively coupled, one to another. Although not shown, the computing device 102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 204 is representative of functionality to perform one or more operations using hardware. Accordingly, the processing system 204 is illustrated as including hardware elements 210 that may be configured as processors, functional blocks, and so forth. This may include implementation in hardware as an application specific integrated circuit or other logic device formed using one or more semiconductors. The hardware elements 210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 206 is illustrated as including memory/storage 212. The memory/storage 212 represents memory/storage capacity associated with one or more computer-readable media. The memory/storage component 212 may include volatile media (such as random access memory (RAM)) and/or nonvolatile media (such as read only memory (ROM), Flash memory, optical disks, magnetic disks, and so forth). The memory/storage component 212 may include fixed media (e.g., RAM, ROM, a fixed hard drive, and so on) as well as removable media (e.g., Flash memory, a removable hard drive, an optical disc, and so forth). The computer-readable media 206 may be configured in a variety of other ways as further described below.

Input/output interface(s) 208 are representative of functionality to allow a user to enter commands and information to computing device 202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 102 may be configured in a variety of ways as further described below to support user interaction.

Computing device 102 also includes a web browser 213 that can operate to enable a user to browse the web.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 210 and computer-readable media 206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 210. The computing device 102 may be configured to implement particular instructions and/or functions corresponding to the software and/or hardware modules. Accordingly, implementation of a module that is executable by the computing device 102 as software may be achieved at least partially in hardware, e.g., through use of computer-readable storage media and/or hardware elements 210 of the processing system 204. The instructions and/or functions may be executable/operable by one or more articles of manufacture (for example, one or more computing devices 102 and/or processing systems 204) to implement techniques, modules, and examples described herein.

As further illustrated in FIG. 2, the example system 200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 202 may assume a variety of different configurations, such as for computer 214, mobile 216, and television 218. Each of these configurations includes devices that may have generally different constructs and capabilities, and thus the computing device 102 may be configured according to one or more of the different device classes. For instance, the computing device 602 may be implemented as the computer 214 class of a device that includes a personal computer, desktop computer, a multi-screen computer, laptop computer, netbook, and so on.

The computing device 202 may also be implemented as the mobile 216 class of device that includes mobile devices, such as a mobile phone, portable music player, portable gaming device, a tablet computer, a multi-screen computer, and so on. The computing device 202 may also be implemented as the television 218 class of device that includes devices having or connected to generally larger screens in casual viewing environments. These devices include televisions, set-top boxes, gaming consoles, and so on.

The techniques described herein may be supported by these various configurations of the computing device 102 and are not limited to the specific examples of the techniques described herein. This functionality may also be implemented all or in part through use of a distributed system, such as over a "cloud" 220 via a platform 222 as described below.

The cloud 220 includes and/or is representative of a platform 222 for resources 224 and communication services. The platform 222 abstracts underlying functionality of hardware (e.g., servers) and software resources of the cloud 220. The resources 224 may include applications and/or data that can be utilized while computer processing is executed on servers that are remote from the computing device 102. Resources 224 can also include services, such as web services, provided over the Internet and/or through a subscriber network, such as a cellular or Wi-Fi network.

The platform 222 may abstract resources and functions to connect the computing device 102 with other computing devices. The platform 222 may also serve to abstract scaling of resources to provide a corresponding level of scale to encountered demand for the resources 224 that are implemented via the platform 222. Accordingly, in an interconnected device embodiment, implementation of functionality described herein may be distributed throughout the system 200. For example, the functionality may be implemented in part on the computing device 202 as well as via the platform 222 that abstracts the functionality of the cloud 220.

In the discussion that follows, various sections describe example embodiments. A section entitled "Example Message Service Environment" describes a message service environment that can be utilized to implement the various embodiments described herein. Next, a section entitled "Example SMS Gateway MSC" describes an example SMS Gateway MSC in accordance with one or more embodiments. Following this, a section entitled "Number Pools" describes an example number pool in accordance with one or more embodiments. Next, a section entitled "Shared Numbers" describes shared numbers that can be utilized in accordance with one or more embodiments. Following this, a section entitled "Dedicated Numbers" describes dedicated numbers that can be utilized in accordance with one or more embodiments. Next, a section entitled "Policy-Driven Selection between Shared and Dedicated Numbers" describes various policy approaches that can drive how numbers are assigned in accordance with one or more embodiments. Following this, a section entitled "Local Numbers" describes how local numbers can be assigned in accordance with one or more embodiments. Next, a section entitled "Country-based Routing" describes how routing can be performed in accordance with one or more embodiments. Following this, a section entitled "Carrier-based Routing" describes how routing can be performed based on carriers in accordance with one or more embodiments. Next, a section entitled "Provisioning Different Pools for Different Needs" describes how pools can be provisioned in accordance with one or more embodiments. Following this, a section entitled "Group Messaging" describes how messages can be sent in group scenarios in accordance with one or more embodiments. Next, a section entitled "Mobile Numbers as Sender ID" describes how mobile numbers can be utilized as a sender ID in accordance with one or more embodiments. Following this, a section entitled "Voice Routing" describes how the techniques can be applied to voice routing scenarios. Next, a section entitled "Auto-Allocation of Shared Numbers by Recipient's Area Code" describes how area codes can be considered in allocating shared numbers in accordance with one or more embodiments. Following this, a section entitled "Pricing Models" describes pricing model considerations in accordance with one or more embodiments. Last, a section entitled "Example Device" describes an example device that can be utilized to implement one or more embodiments.

Example Message Service Environment

Figure 3:
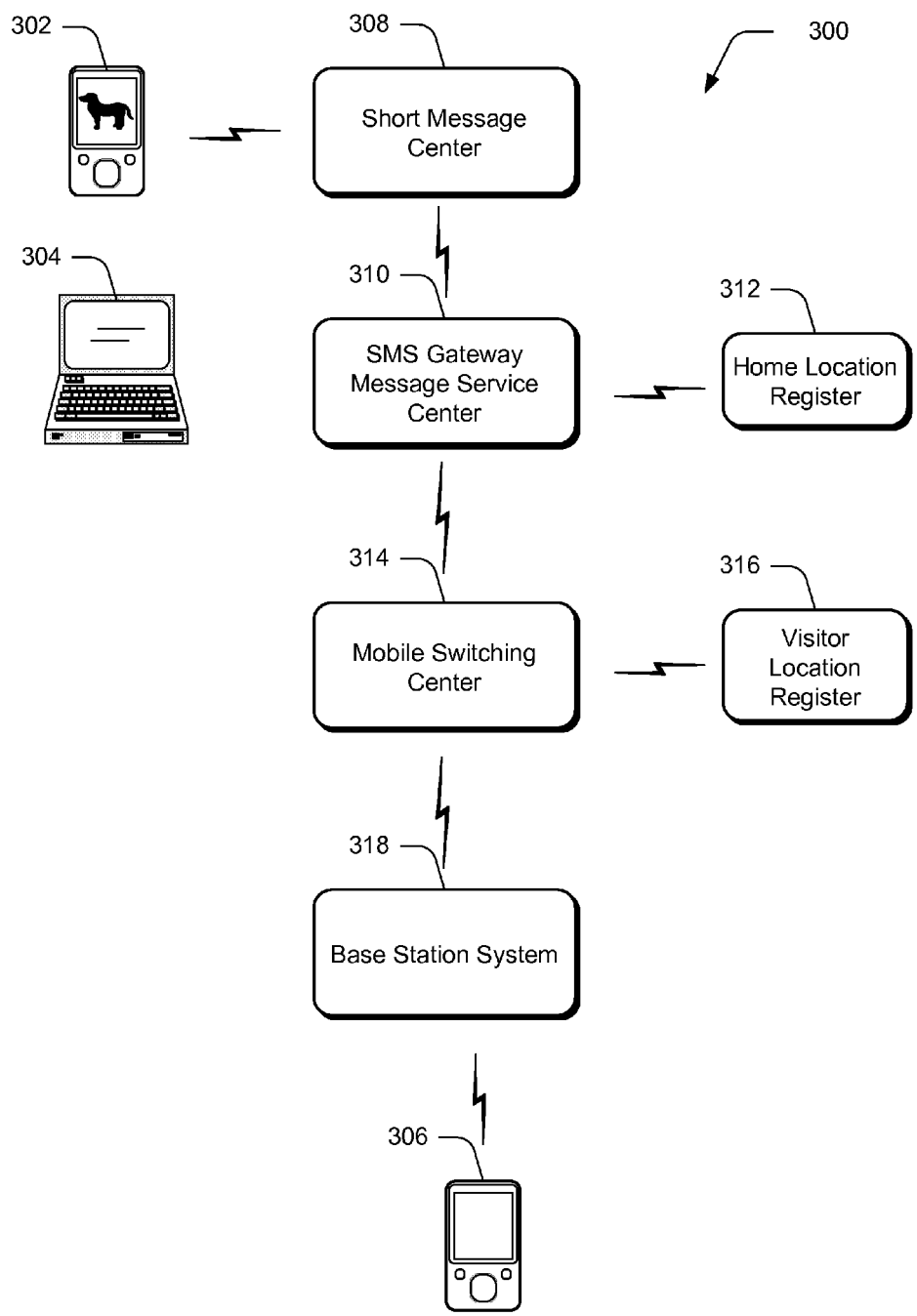
FIG. 3 illustrates an example Global System for Mobile Communication (GSM) network that can be used to implement various embodiments.

FIG. 3 illustrates a system, generally at 300, which can be used to implement the embodiments described herein. The system includes various client devices examples of which are shown at 302, 304, and 306. In this example, client devices 302 and 304 can send messages, such as SMS and MMS messages, to a client device 306 using the illustrated components. It is to be appreciated and understood that system 300 constitutes but one type of system that can be utilized to implement the techniques described herein. As such, other systems can be utilized without departing from the spirit and scope of the claimed subject matter.

System 300 also includes a Global System for Mobile Communication (GSM) network having various network elements including a Short Message Center (SMC) element 308, an SMS gateway Message Service Center (SMS gateway MSC) 310, a Home Location Register (HLR) 312, a Mobile Switching Center (MSC) 314, a Visitor Location Register (VLR) 316, and a base station system 318.

In operation, system 300 utilizes a store and forward approach to transmitting messages from and to the client devices 302, 304, and 306. The messages can be sent or received with a voice/data/fax service over the GSM network. The illustrated GSM network supports national and international message delivery.

When a client device, such as client device 302, sends a message, the message is received by the SMC element 308 which performs the task of storing and forwarding messages to and from the client device. SMS gateway MSC 310 receives the SMS message from the SMC element 308 and serves as a mobile network's point of contact with other networks. When an SMS message is received from SMC 308, SMS gateway MSC 310 utilizes Home Location Register 312 to ascertain information associated with the intended recipient of the SMS message. The Home Location Register 312 serves as a database in the network and includes information pertaining to the subscription profile of various devices and routing information for the associated subscribers, e.g. the area covered by an MSC (e.g., MSC 314) where the device is currently situated. The SMS gateway MSC 310 is thus able to pass the message to the correct MSC. In the embodiments described below, the SMS gateway MSC 310 is configured to implement two-way messaging by automatically assigning temporary numbers, referred to as a "sender ID" to messages from a pool of numbers. The temporary assigned numbers are grouped with a number, e.g., a phone number, associated with an intended message recipient and this grouping is mapped to the number of the originator of the message. Recipients of the SMS message can then reply to the assigned number and the reply will be mapped to the originator's number and sent back to the sender or originator of the message, as described in more detail below. It is to be appreciated and understood, however, that the techniques described herein can be applied using technologies other than circuit-switched technology employed by SMSCs and SS7. By way of example and not limitation, such technologies can include server-based technologies residing outside the SS7 network such as SMSCs communicating via the IP network and REST interfaces to applications on conventional servers running operating systems such as Linux and others. These applications may communicate with databases such as Postgres or MySQL.

MSC 314 is configured to switch connections between mobile stations or between mobile stations and a fixed network. The Visitor Location Register 316 is communicatively associated with MSC 314 and contains temporary information about devices such as information associated with device identification and the cell or cells where the device is currently situated. Using information from the Visitor Location Register 316, the MSC 314 is able to switch the information to the corresponding base station system 318 which, in turn, transmits the SMS message to client device 306. The base station system 318 includes transceivers which send and receive information over an air interface to and from client device 306.

Having described an example message service environment, consider now a discussion of an example SMS gateway MSC in accordance with one or more embodiments.

Example SMS Gateway MSC

Figure 4:
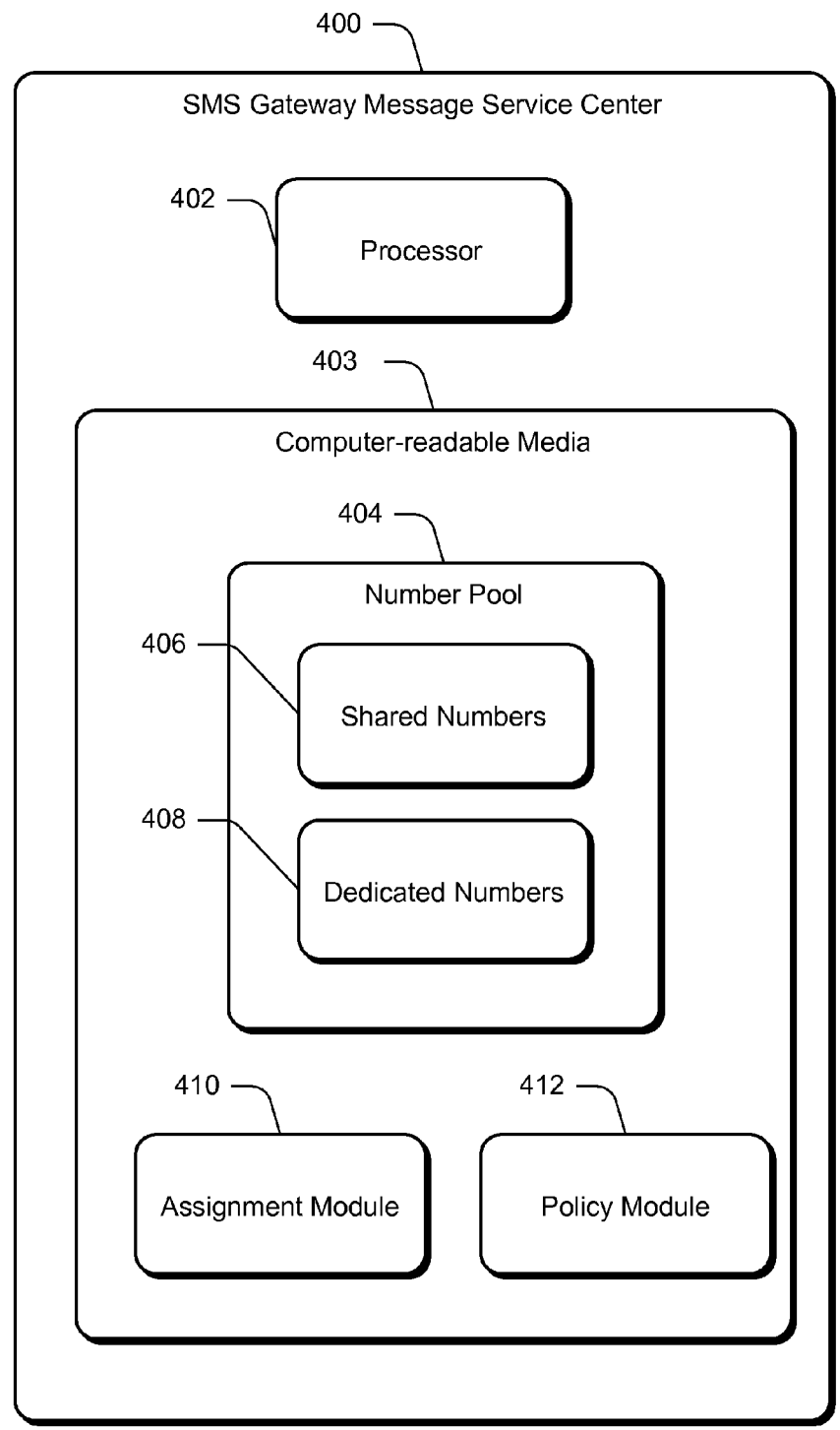
FIG. 4 illustrates an example SMS Gateway Message Service Center in accordance with one or more embodiments.

FIG. 4 illustrates an example SMS gateway MSC, in accordance with one or more embodiments, generally at 400. The SMS gateway MSC 400 includes one or more processors 402 and one or more computer readable media 403, for example, computer readable storage media. The computer readable media 403 includes a number pool 404 which, in at least some embodiments, can include both shared numbers 406 and dedicated numbers 408 which can be assigned to outbound SMS messages as described in more detail below. Assignment of numbers from the number pool 404 can be performed by assignment module 410 which can maintain a mapping between an originator's number and the combination of an assigned number and the intended recipient's number.

In addition, SMS gateway MSC 400 includes a policy module 412 that can be utilized by the SMS gateway MSC 400 to assign numbers from the number pool in a manner that comports with various regulatory considerations across a variety of countries, as well as various business concerns, as will become apparent below.

Number Pools

In one or more embodiments, two-way message service communication, e.g., SMS, MMS and the like, is implemented by automatically assigning temporary numbers from a pool of numbers. The temporary assigned numbers are grouped with a number, e.g., a phone number, associated with an intended message recipient. Recipients of the messages can typically see the assigned number when they receive a message, and can then reply to the assigned number. The reply will be sent back to the sender, as described in more detail below.

For example, when a user sends a text message, upon receipt, SMS gateway MSC 400 automatically assigns, via assignment module 410, a phone number from a pool of numbers, such as number pool 404, that it manages. This assigned phone number is set as the sender ID of the outbound text message. For example, the assigned number appears in the "from" field of the text message when it arrives on the recipient's computing device. This assigned phone number is mapped, by the assignment module 410, to the originator of the message so that when the recipient replies to the phone number, their reply can be routed back to the originator. Specifically, when the recipient replies, SMS gateway MSC 400 can look up the recipient's phone number and the phone number to which the recipient replied, in order to determine how to route the message back to the user who originated the message. This process can be performed in the background and can be unbeknownst to the sender of the outbound message. In this manner, the sender does not have to previously purchase or choose to acquire this sender ID.

Figure 5:
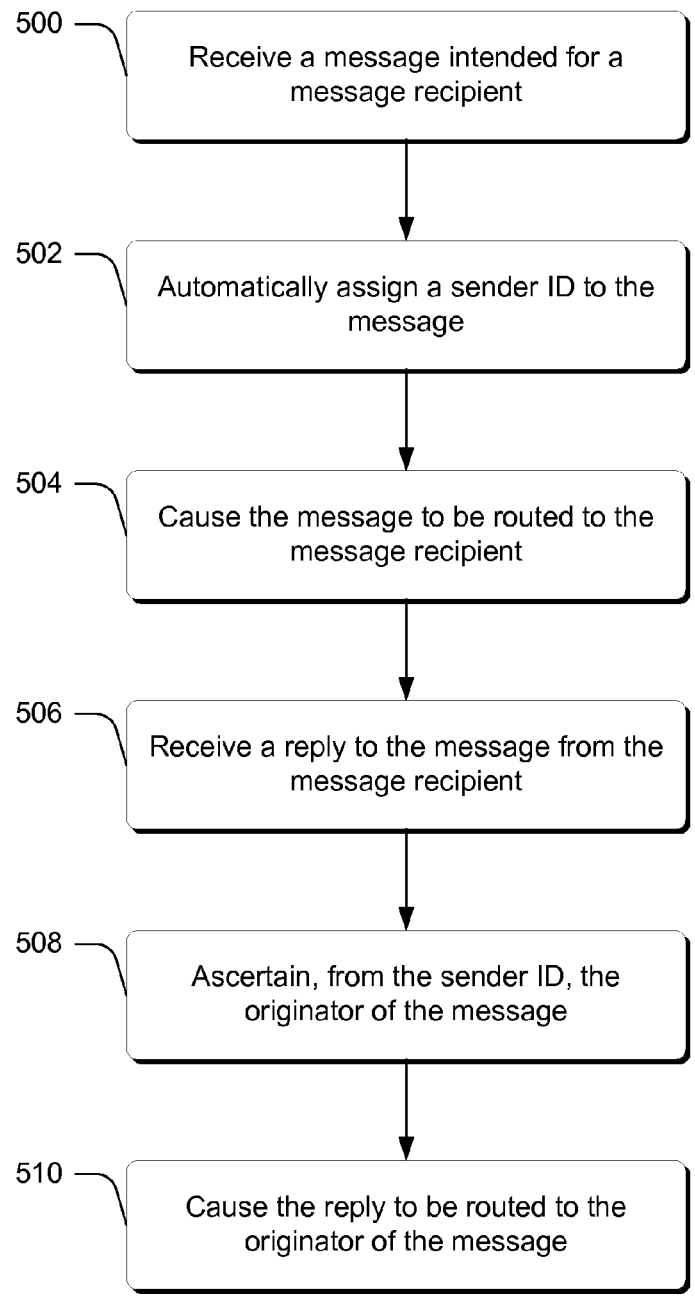
FIG. 5 is a flow diagram that describes steps in a method in accordance with one or more embodiments.

FIG. 5 is a flow diagram that describes steps in a method in accordance with one or more embodiments. The method can be implemented in connection with any suitable hardware, software, firmware, or combination thereof. In at least some embodiments, the method is implemented by one or more suitably-configured elements in a GSM network. But one example of a suitably-configured element is the SMS gateway MSC described above.

Step 500 receives a message intended for a message recipient. This step can be performed in any suitable way. For example, in at least some embodiments, an SMS message can be received. Alternately or additionally, an MMS message can be received. In addition, this step can be performed by receiving a single message intended for multiple different recipients, examples of which are provided below. Step 502 automatically assigns a sender ID to the message. This message can be performed in any suitable way. For example, any suitably-configured routable sender ID can be assigned to the message, examples of which are provided below. In at least some embodiments, sender IDs can be assigned based on the destination of the message, e.g., the location of the device to which the message is to be sent. Step 504 causes the message to be routed to the message recipient. This step can be performed in any suitable way such as, by way of example and not limitation, routing the message or causing the message to be routed to other elements within the GSM network.

Step 506 receives a reply to the message from the message recipient. Step 508 ascertains, from the sender ID, the originator of the message. This can be done by using a lookup table in which the sender ID and associated recipient phone number is associated with the phone number of the originator of the message. Step 510 causes the reply to be routed to the originator of the message. This step can be performed by using the phone number of the originator of the message to cause the reply to be routed to the originator. This effectively redirects the reply to the communication module, e.g., communication module 104 (FIGS. 1 and 2) associated with the device or user who sent the original message.

Having considered how sender IDs can be automatically assigned to outbound messages in accordance with one or more embodiments, consider now various different types of sender IDs.

Shared Numbers

In one or more embodiments, sender IDs can be selected from a pool of shared numbers that are managed by SMS gateway MSC 400 (FIG. 4). In one or more embodiments, when a user sends an outbound text message, the system looks into its pool of shared numbers that are designated for use with outbound messages. A sender ID is selected from this pool by ensuring that the combination of the destination number and the sender ID number are not currently paired for another user. When a sender ID number is selected, it is paired with the destination number and the combination is associated with the user through, e.g., a mapping table. Outbound messages are sent to the destination number using the sender ID assigned. Every outbound message sent by the user to the destination number is sent using the same sender ID. Inbound replies from the destination number are sent to the sender ID number, which are then received by the system and used to determine the user, e.g. by using the mapping table, to relay the message to the user.

Using shared numbers can enable smaller finite pools of numbers to be allocated. The mapping of the sender ID and destination number to the originator of the message can be maintained indefinitely so that one mapping of the sender ID and destination recipient pair always corresponds to a single originator. By using a pair to perform the mapping to the originator instead of only using the sender ID, the shared number can be used as the sender ID for other destination recipients. As long as each destination recipient is assigned a different sender ID to reply to a different conversation, sender IDs can be reused for other destination recipients. In this use case, every destination recipients can be in as many separate conversations as there are shared numbers in the shared number pool.

The pool of shared numbers can come from any suitable source to be managed by the SMS gateway MSC 400. In at least some embodiments, pools of shared numbers are received from providers or carriers that utilize the GSM network. The shared numbers can then be used to route messages to subscribers of the providers or carriers. Assignments of shared numbers as sender IDs in combination with their pairing with the destination number and subsequent mapping to the originator's number causes the assignments to be unique as between an originator of the message and the message's recipient. The same shared number can be paired with other different destination numbers and mapped to other different originators, thus providing a unique mapping mechanism as between originators and recipients.

Shared numbers can be assigned using any suitable numeric addressing methodology that will enable and allow messages to be sent and received. For example, shared numbers can be mobile numbers, landline numbers that enable message delivery, five-digit short codes, six-digit short codes and the like.

Dedicated Numbers

In one or more embodiments, dedicated numbers can be assigned to individual users as sender IDs. Specifically, when a user sends an outbound message, the system, e.g. SMS gateway MSC 400, looks into a pool of dedicated numbers that are designated for use with outbound messages. A sender ID number is selected from this pool if it is determined that the user does not currently have a sender ID assigned. Once the sender ID number is assigned from the pool to the user, the assigned number is marked as being assigned to this user and becomes unavailable for assignment to other users.

Outbound messages are sent to the destination numbers using the sender ID assigned. Every outbound message that is sent by the user is sent using the same sender ID. Inbound replies from destination numbers are sent to the sender ID number, which are then received by the system. This number pair, i.e. sender ID/destination number, is used to determine the user to which to relay the reply. The sender ID alone can be used to determine the user to relay the message to since the number is mapped to a single user.

Policy-Driven Selection Between Shared and Dedicated Numbers

In one or more embodiments, a policy-driven approach can be utilized to determine whether to assign shared or dedicated numbers as sender IDs. This policy-driven approach can be implemented through the use of a suitably-configured policy module, such as policy module 412 (FIG. 4).

In at least some embodiments, location-based policies can be utilized to drive number assignments. For example, when the system receives an outbound message, it ascertains the destination of the message. Based on the destination of the message, the assignment module 410 can select an appropriate algorithm to use to choose between shared or dedicated numbers. As such, the system can utilize number pool 404 to dynamically choose a number based upon the location of the intended recipient. For example, some countries allow the use of shared numbers while other countries do not. Based on the location of the intended recipient, shared or dedicated numbers can be selected as sender IDs in compliance with country-specific policies and regulations.

Selection between shared and dedicated numbers can also be driven by policies of the various carriers or providers from which the numbers are received. For example, some carriers or providers may allow for the use of shared numbers while others may not. Based upon the carrier, an appropriate sender ID can be selected in compliance with carrier or provider policies.

Selection between shared and dedicated numbers can also be driven by policies associated with cost and related business models. For example, in some countries it may be expensive to use dedicated numbers and cheaper to use shared numbers. In these instances, a cost-related decision can be made to select a shared number as a sender ID rather than a dedicated number.

Accordingly, the use of shared and dedicated numbers together with a policy-driven approach to number assignment can ensure unique assignments of numbers that are directed to determining the best way to get messages from and to users that comply with regulatory and policy concerns.

Figure 6:
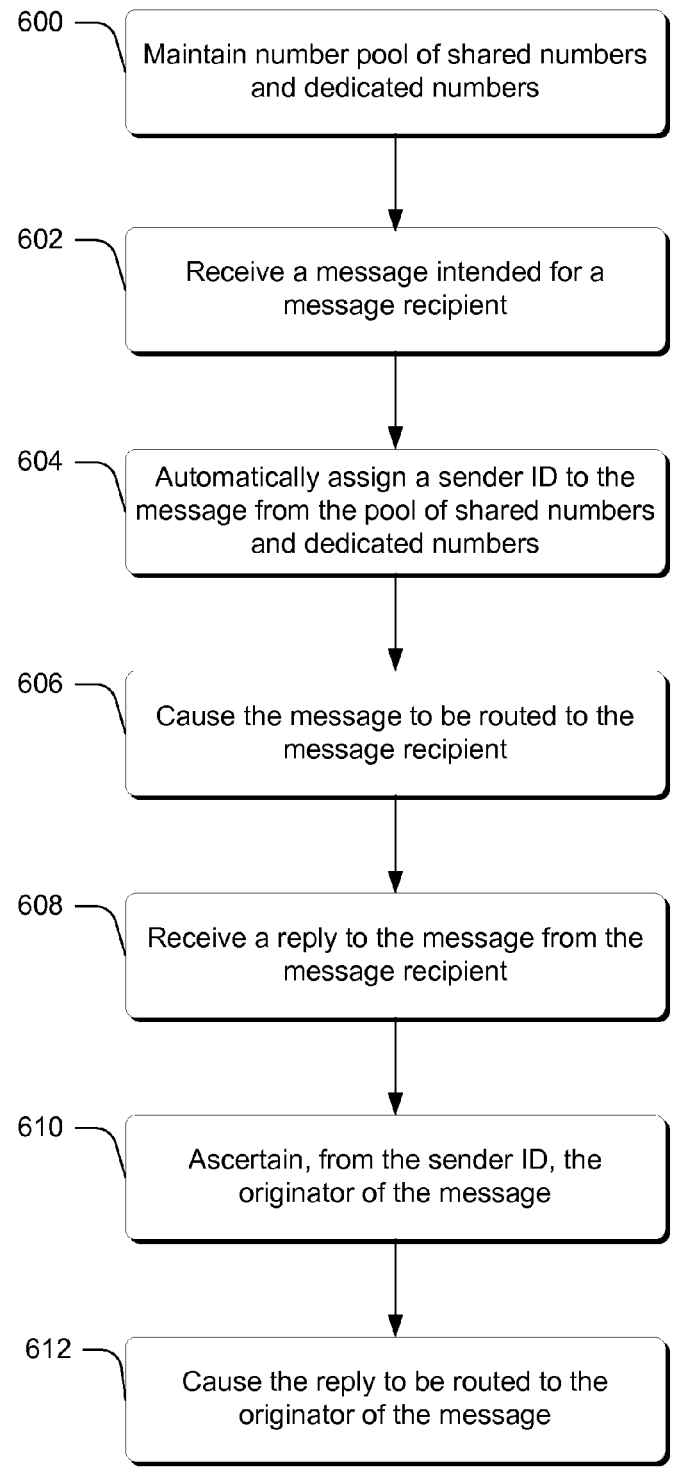
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware, or combination thereof. In at least some embodiments, the method is implemented by one or more suitably-configured elements in a GSM network. But one example of a suitably-configured element is the SMS gateway MSC described above.

Step 600 maintains a number pool of shared numbers and dedicated numbers. Examples of shared numbers and dedicated numbers are provided above. Step 602 receives a message intended for a message recipient. This step can be performed in any suitable way. For example, in at least some embodiments, an SMS message can be received. Alternately or additionally, an MMS message can be received. In addition, this step can be performed by receiving a single message intended for multiple different recipients, examples of which are provided below. Step 604 automatically assigns a sender ID to the message from the pool of shared numbers and the dedicated numbers. Examples of how this can be done are provided above. This step can be performed in any suitable way. For example, any suitably-configured routable sender ID can be assigned to the message, examples of which are provided above. Step 606 causes the message to be routed to the message recipient. This step can be performed in any suitable way such as, by way of example and not limitation, routing the message or causing the message to be routed to other elements within the GSM network.

Step 608 receives a reply to the message from the message recipient. Step 610 ascertains, from the sender ID, the originator of the message. This can be done by using a lookup table in which the sender ID is associated with the phone number of the originator of the message. Step 612 causes the reply to be routed to the originator of the message. This step can be performed by using the phone number of the originator of the message to cause the reply to be routed to the originator.

Figure 7:
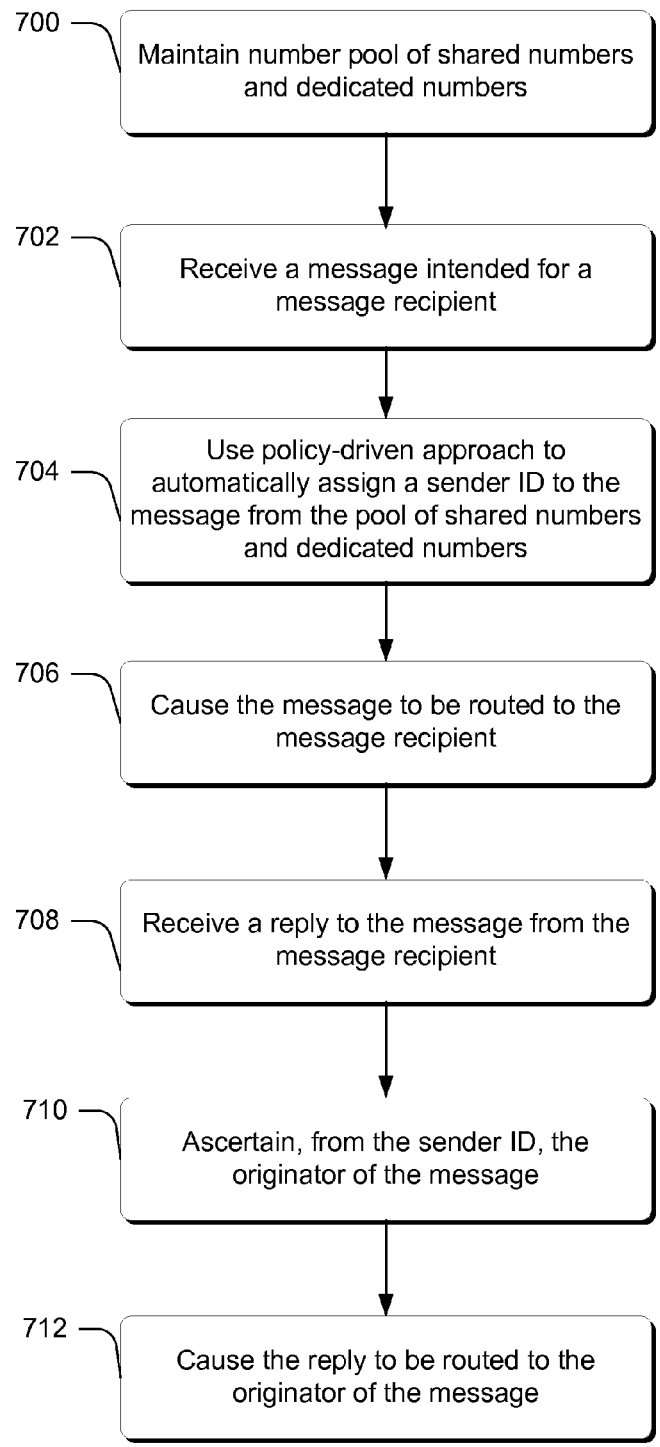
FIG. 7 is a flow diagram that describes steps in a method in accordance with one or more embodiments.

FIG. 7 is a flow diagram that describes steps in a method in accordance with one or more embodiments. The method can be implemented in connection with any suitable hardware, software, firmware, or combination thereof. In at least some embodiments, the method is implemented by one or more suitably-configured elements in a GSM network. But one example of a suitably-configured element is the SMS gateway MSC described above.

Step 700 maintains a number pool of shared numbers and dedicated numbers. Examples of shared numbers and dedicated numbers are provided above. Step 702 receives a message intended for a message recipient. This step can be performed in any suitable way. For example, in at least some embodiments, an SMS message can be received. Alternately or additionally, an MMS message can be received. Step 704 uses a policy-driven approach to automatically assign a sender ID to the message from the pool of shared numbers and the dedicated numbers. Examples of various policies and how they can be utilized to allocate between shared and dedicated numbers are provided above. This step can be performed in any suitable way. For example, any suitably-configured routable sender ID can be assigned to the message in association with any relevant policies, examples of which are provided above. Step 706 causes the message to be routed to the message recipient. This step can be performed in any suitable way such as, by way of example and not limitation, routing the message or causing the message to be routed to other elements within the GSM network.

Step 708 receives a reply to the message from the message recipient. Step 710 ascertains, from the sender ID, the originator of the message. This can be done by using a lookup table in which the sender ID is associated with the phone number of the originator of the message. Step 712 causes the reply to be routed to the originator of the message. This step can be performed by using the phone number of the originator of the message to cause the reply to be routed to the originator.

Having considered embodiments in which both shared and dedicated numbers can be assigned, consider now the notion of using a local number as a sender ID for cost reducing measures.

Local Numbers

Typically, the cost associated with sending a message from a mobile phone to a local number is cheaper than sending a message to a non-local or international number. In one or more embodiments, sender IDs are selected in view of the location of an intended recipient of the message to provide a local number to which to respond. In this manner, when the recipient of the message responds to the local number, they will not incur regional or international fees associated with responding to a message received from outside their locale.

For example, when a message is received by SMS gateway MSC 400, the system can ascertain the geographic location of the intended recipient of the message. Once the geographic location of the intended recipient of the message is ascertained, the system can assign either a local shared or dedicated number to use as the sender ID. In this manner, when the recipient of the message replies to the message, they will reply to a local number and hence not incur regional or international fees. This can increase the probability that a non-local user will reply to the message because they are replying to a local number.

For example, assume that a user in the United States sends a message via their chat client to a user in Germany. The message may be cheap or even free for the user to send. Yet, because the recipient in Germany would be replying to a number in the United States, they would incur international fees. In this instance, assigning a sender ID in the form of a local German number to the outbound message would ensure that the recipient replies to a local number and, hence, does not incur international fees.

Figure 8:
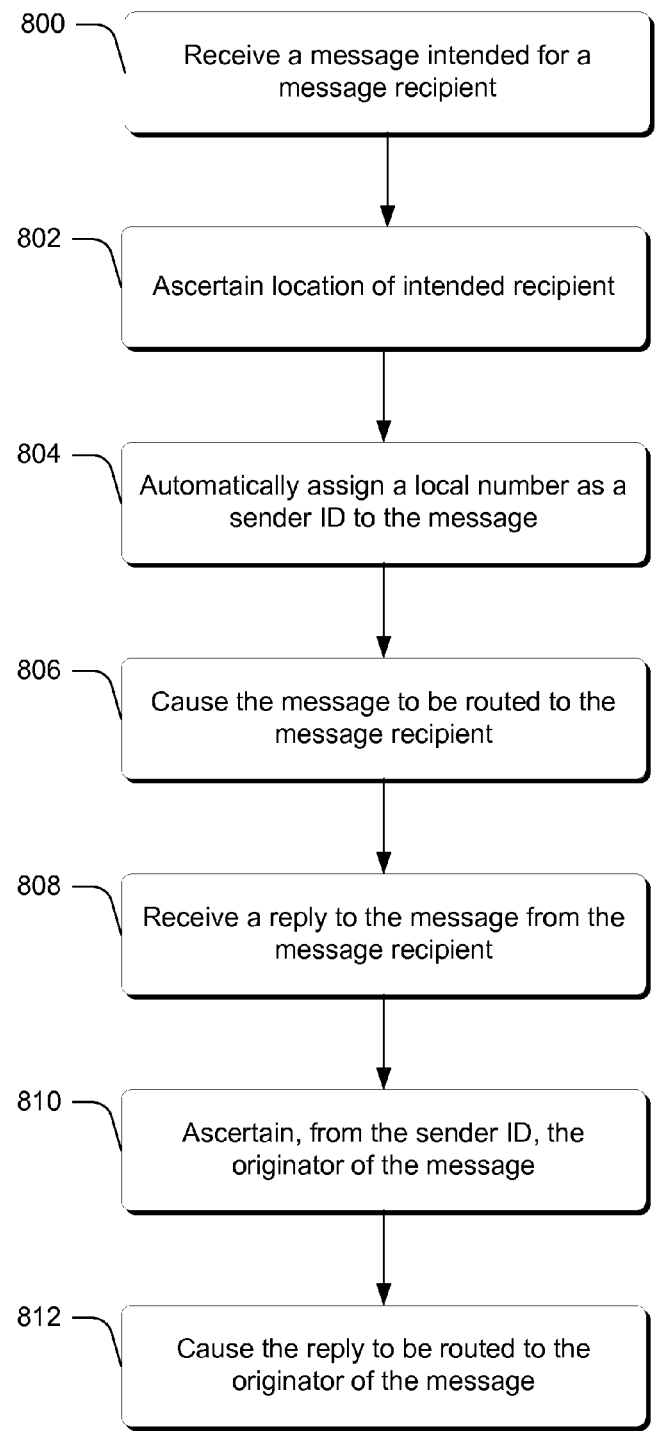
FIG. 8 is a flow diagram that describes steps in a method in accordance with one or more embodiments.

FIG. 8 is a flow diagram that describes steps in a method in accordance with one or more embodiments. The method can be implemented in connection with any suitable hardware, software, firmware, or combination thereof. In at least some embodiments, the method is implemented by one or more suitably-configured elements in a GSM network. But one example of a suitably-configured element is the SMS gateway MSC described above.

Step 800 receives a message intended for a message recipient. This step can be performed in any suitable way. For example, in at least some embodiments, an SMS message can be received. Alternately or additionally, an MMS message can be received. Step 802 ascertains a location of the intended recipient. This step can be performed by ascertaining, from the phone number of the intended recipient, their country or locale. Step 804 automatically assigns a local number as a sender ID to the message. This step can be performed in any suitable way. For example, any suitably-configured local routable sender ID can be assigned to the message, examples of which are provided above. Step 806 causes the message to be routed to the message recipient. This step can be performed in any suitable way such as, by way of example and not limitation, routing the message or causing the message to be routed to other elements within the GSM network.

Step 808 receives a reply to the message from the message recipient. Step 810 ascertains, from the sender ID, the originator of the message. This can be done by using a lookup table in which the sender ID is associated with the phone number of the originator of the message. Step 812 causes the reply to be routed to the originator of the message. This step can be performed by using the phone number of the originator of the message to cause the reply to be routed to the originator.

Country-Based Routing

In one or more embodiments, the system can assign different sender IDs from different number pools to a user when he or she sends text messages to recipients in different countries. This is, in essence, an extension of the embodiment described just above. For example, when a user sends a text message to a recipient in the United States, the system can select and assign a sender ID from a United States number pool. The recipient then receives a message from a number in the United States and is able to reply to that number. Likewise, when the user sends a text message to a recipient in the United Kingdom, the system can select a sender ID from a number pool associated with the United Kingdom so that the recipient there can reply to a United Kingdom number.

As a result, a user can have multiple phone numbers assigned so that different recipients in various countries can all have a local phone number to which they can reply and have message is routed back to the original user.

Carrier-Based Routing

In one or more embodiments, the system can assign different sender IDs from different number pools depending on the routes available for the forward and/or reply path. The outbound and inbound message routes will determine whether the messages can be successfully sent to and received from both the sender and recipient. In this embodiment, the phone number of the recipient may be looked up in a database, such as the SS7 phone network's Home Location Register (HLR) to obtain the operator handling messages for this device. The forward and reply paths between this operator and the provider of the sender ID numbers in the system's pool can be looked up in a routing table to determine the availability of a connection path between the two parties. This connection information can be used to select a sender ID number pool with the level of connectivity most likely to facilitate forward and reply pads for the messages.

This carrier-based routing can also be used for least-cost routing or other rules or policies that attempt to optimize on cost, regulatory requirements, business requirements, or other factors. In this manner, sender IDs can be selected such that carriers route messages from and to their own users. For example, if user A utilizes T-Mobile as a carrier and utilizes a chat client that has SMS forwarding enabled, and sends a message to user B's chat client, a sender ID can be selected as a T-Mobile number. Accordingly, when the message is forwarded by user A's chat client, it is forwarded over the T-Mobile network to user A.

Provisioning Different Pools for Different Needs

In one or more embodiments, and as noted above, depending on various factors associated with the use of local numbers or international numbers for assignment, e.g. availability, cost, regulatory requirements, business rules can be utilized around the use of each type of number, e.g., shared or dedicated, and determine which numbers are used in the number pools.

As mentioned previously, number pools can contain dedicated or shared numbers that can be local or international to the countries they are associated with. In addition, rules can be utilized to determine desired number pools for connectivity between different carriers within and outside various countries. Business rules can then be utilized to prioritize and match the various number pools with sender or recipient countries or both. For example, messages sent to the United States destination numbers of a specific operator can be assigned a sender ID from the pool of dedicated United States numbers, whereas messages sent to Canadian destination numbers can be assigned a sender ID from the pool of shared Canadian numbers. Further, a user in France may be assigned a number from the pool dedicated to the United Kingdom if French numbers are not available.

This flexibility allows the system to support replies from mobile devices in any country, overcoming inbound and outbound routing connectivity limitations of SMS aggregators and carriers, high SMS and phone number costs, and regulatory restrictions of using phone number resources in certain countries.

Group Messaging

In one or more embodiments, sender IDs can be selected for SMS recipients who are members of a group in a manner that achieves the objectives described above.

For example, when a single number is utilized as a sender ID for a group of SMS recipients, the sender ID for the group messages can be selected from a pool that best satisfies criteria specified by business rules in the system. Business rules can include, by way of example and not limitation, such things as selecting from a certain pool based on whether all members of the group are in the same country, or based on availability of numbers from a certain country.

In one or more embodiments, multiple different sender IDs can be assigned on a per group basis depending on the location of various recipients within the group. For example, if a group contains users in three different countries, sender IDs associated with those three different countries can be assigned to messages intended for recipients who reside or are currently located in those countries. This can allow users in each country to reply to a local number in their respective country. For example, all United States users in a group can reply to United States phone number, while all United Kingdom users in a group can reply to a United Kingdom number, and all Indian users in the group can reply to an Indian phone number. As in the various embodiments described above, different pools of numbers can be assigned according to different conditions and rules. For example, if Japanese phone numbers are not available for assignment, Japanese SMS recipients can be assigned numbers from a United States pool assuming, of course, that the United States pool has been chosen as a next best alternative because of cost, coverage, or user experience reasons.

In one or more other embodiments, the assignment of sender IDs from pools is done on a per-recipient basis. This provides even greater flexibility than assigning numbers from country pools. For example, in countries that have high interconnectivity costs, e.g., routing between one carrier to another carrier, the cost to send SMS messages can be reduced by having direct operator relationships and interconnections so that messages for operator X's user are sent via operator X's network, for operator Y's user via operator Y's network, and so on. In this case, the system can determine each group member's operator and select a sender ID from the pool that contains the phone numbers from that operator. The resulting outbound and inbound messages for this user will then be routed using a sender ID number from this operator. By doing this for each recipient in the group, the system is able to select desired or optimal sender ID numbers for the entire group.

Mobile Numbers as Sender ID

In one or more embodiments, the user can be provided with an opportunity to choose whether to use a system-determined sender ID number or the user's own mobile number as a sender ID on outbound messages. The former will give the user the ability to receive messages in a device or application other than the user's mobile phone, whereas the latter allows the recipient to recognize the phone number the messages sent from as belonging to the user.

A variant of this approach can also use a number from the pool if the pool is available for a recipient, and use the user's own mobile number if the pool is not available due to, for example, number availability, routing limitations, and the like.

Voice Routing

In addition, while the above-described embodiments have been described in the context of messages including SMS and MMS messages, the embodiments can be extended to voice calls as well, such as those that occur over the Internet using, for example, VoIP.

Auto-Allocation of Shared Numbers by Recipient's Area Code

In one or more embodiments, sender IDs can be selected based upon area codes that appear in the number pool that match the recipient's phone number. In this manner, the user experience for the recipient can be made to feel more familiar and increase the probability that the recipient will reply. Accordingly, instead of seeing a strange or different area code appear in a received message, the recipient will see a sender ID that is in the same area code or state that is more easily recognized by the recipient.

Pricing Models

In one or more embodiments, users can be presented with different price models from which to select when sending messages. Such can be based on the source and destination locations. For example, based on the sender's location and the destination mobile number, a determination as to price for sending messages can be made and price options can be presented to the sender. Accordingly, if a sender is located in the United States, the sender can be shown prices to send messages to various countries. If the sender is located in India, they might be presented with different price options associated with that country, and so on. In this manner, a user's location can be determined and price models can be presented accordingly.

Example Device

Figure 9:
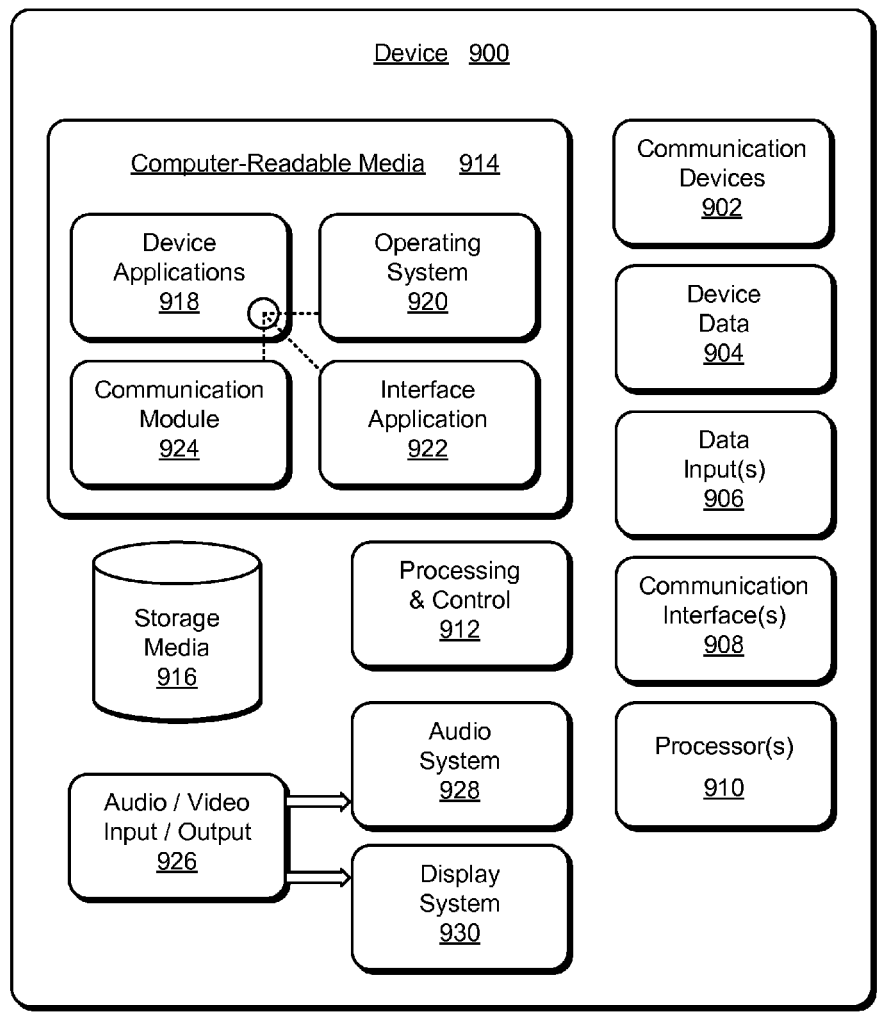
FIG. 9 illustrates an example computing device that can be utilized to implement various embodiments described herein.

FIG. 9 illustrates various components of an example device 900 that can be implemented as any type of portable and/or computer device as described with reference to FIGS. 1 and 2 to implement the embodiments described herein. Device 900 includes communication devices 902 that enable wired and/or wireless communication of device data 904 (e.g., received data, data that is being received, data scheduled for broadcast, data packets of the data, etc.). The device data 904 or other device content can include configuration settings of the device, media content stored on the device, and/or information associated with a user of the device. Media content stored on device 900 can include any type of audio, video, and/or image data. Device 900 includes one or more data inputs 906 via which any type of data, media content, and/or inputs can be received, such as user-selectable inputs, messages, music, television media content, recorded video content, and any other type of audio, video, and/or image data received from any content and/or data source.

Device 900 also includes communication interfaces 908 that can be implemented as any one or more of a serial and/or parallel interface, a wireless interface, any type of network interface, a modem, and as any other type of communication interface. The communication interfaces 908 provide a connection and/or communication links between device 900 and a communication network by which other electronic, computing, and communication devices communicate data with device 900.

Device 900 includes one or more processors 910 (e.g., any of microprocessors, controllers, and the like) which process various computer-executable or readable instructions to control the operation of device 900 and to implement the gesture embodiments described above. Alternatively or in addition, device 900 can be implemented with any one or combination of hardware, firmware, or fixed logic circuitry that is implemented in connection with processing and control circuits which are generally identified at 912. Although not shown, device 900 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 900 also includes computer-readable media 914, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 900 can also include a mass storage media device 916.

Computer-readable media 914 provides data storage mechanisms to store the device data 904, as well as various device applications 918 and any other types of information and/or data related to operational aspects of device 900. For example, an operating system 920 can be maintained as a computer application with the computer-readable media 914 and executed on processors 910. The device applications 918 can include a device manager (e.g., a control application, software application, signal processing and control module, code that is native to a particular device, a hardware abstraction layer for a particular device, etc.). The device applications 918 also include any system components or modules to implement embodiments of the gesture techniques described herein. In this example, the device applications 918 include an interface application 922 and a communication module 924 that are shown as software modules and/or computer applications. The communication module 924 is representative of software that is used to provide communication capabilities such as various messaging (e.g., SMS, MMS, and the like), as well as chat functionality. Alternatively or in addition, the interface application 922 and the communication module 924 can be implemented as hardware, software, firmware, or any combination thereof.

Device 900 also includes an audio and/or video input-output system 926 that provides audio data to an audio system 928 and/or provides video data to a display system 930. The audio system 928 and/or the display system 930 can include any devices that process, display, and/or otherwise render audio, video, and image data. Video signals and audio signals can be communicated from device 900 to an audio device and/or to a display device via an RF (radio frequency) link, S-video link, composite video link, component video link, DVI (digital video interface), analog audio connection, or other similar communication link. In an embodiment, the audio system 928 and/or the display system 930 are implemented as external components to device 900. Alternatively, the audio system 928 and/or the display system 930 are implemented as integrated components of example device 900.

CONCLUSION

Various embodiments support two-way message service and voice communication. In at least some embodiments, temporary numbers from a pool of numbers are automatically assigned to outgoing messages and grouped with the intended recipient's phone number. Recipients can reply to the message by replying to the assigned number and the reply will be sent back to the originator of the message. In at least some embodiments, the pool of numbers includes different types of numbers such as, by way of example and not limitation, shared numbers and dedicated numbers. Further, at least some embodiments can utilize various policies in order to determine how to automatically assign temporary numbers. Such policies can be driven by business rules, regulatory concerns, carrier-based considerations, and the like.

Although the embodiments have been described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
   receiving, from a message originator, a message service message intended for one or more message recipients;
   automatically assigning a sender ID to the message service message based on:
      a geographic destination of the message service message; and
      a service provider associated with each of the one or more message recipients; and
   causing the message service message to be routed to the one or more message recipients with data indicating that the message is originated from the sender ID instead of from a number associated with the message originator.

2. The computer-implemented method of claim 1, wherein said receiving the message service message comprises receiving a Short Message Service message.

3. The computer-implemented method of claim 1, wherein said receiving the message service message comprises receiving a Multimedia Messaging Service message.

4. The computer-implemented method of claim 1, wherein said receiving the message service message comprises receiving a message service message intended for multiple recipients and said automatically assigning comprises automatically assigning at least one different sender ID to at least one of the message service messages.

5. The computer-implemented method of claim 1, wherein said receiving the message service message comprises receiving a message service message intended for multiple recipients and said automatically assigning comprises automatically assigning at least one different sender ID to at least one of the message service messages, the at least one different sender ID comprising a sender ID associated with a country that is different from another country associated with the at least one different sender ID.

6. The computer-implemented method of claim 1 further comprising:
   receiving a reply to the message service message from the one or more message recipients;
   ascertaining, from the sender ID, the message originator of the message service message; and
   causing the reply to be routed to the message originator of the message service message.

7. The computer-implemented method of claim 1, wherein said automatically assigning comprises assigning the sender ID from a number pool comprising shared numbers and dedicated numbers.

8. The computer-implemented method of claim 1, wherein said automatically assigning comprises using a policy-driven approach to determine whether to assign shared numbers or dedicated numbers as the sender ID.

9. The computer-implemented method of claim 1, wherein the sender ID comprises a number that is local to the destination of the message service message.

10. One or more computer-readable storage media embodying computer-readable instructions which, when executed, implement a method comprising:
    receiving, from a message originator, a message intended for multiple message recipients, the message comprising at least one of a message service message or a voice message;
    automatically assigning a sender ID to the message for each of the multiple message recipients based on a geographic location of the message recipient, the automatically assigning comprising automatically assigning at least one different sender ID to at least one of the multiple message recipients; and
    causing the message to be routed to each of the multiple message recipients as originating from the sender ID corresponding to the message recipient instead of originating from a number associated with the message originator.

11. The one or more computer readable storage media of claim 10, wherein said automatically assigning comprises assigning the sender ID from one or more number pools comprising shared numbers and dedicated numbers.

12. The one or more computer readable storage media of claim 10, wherein said automatically assigning comprises using a policy-driven approach to determine whether to assign shared numbers or dedicated numbers as the sender ID, the policy-driven approach using one or more of: location-based policies, carrier or provider policies, or policies associated with cost.

13. A system comprising:
    at least one processor; and
    one or more computer-readable storage media having instructions stored thereon that are executable by the at least one processor to perform operations comprising:
       receiving, from a message originator, a message service message intended for one or more message recipients;
       automatically assigning a sender ID to the message service message based on:
          a geographic destination of the message service message; and
          a service provider associated with each of the one or more message recipients; and
       causing the message service message to be routed to the one or more message recipients with data indicating that the message is originated from the sender ID instead of from a number associated with the message originator.

14. The system of claim 13, wherein said receiving the message service message comprises receiving a Short Message Service message.

15. The system of claim 13, wherein said receiving the message service message comprises receiving a Multimedia Messaging Service message.

16. The system of claim 13, wherein said receiving the message service message comprises receiving a message service message intended for multiple recipients and said automatically assigning comprises automatically assigning at least one different sender ID to at least one of the message service messages.

17. The system of claim 13, wherein said receiving the message service message comprises receiving a message service message intended for multiple recipients and said automatically assigning comprises automatically assigning at least one different sender ID to at least one of the message service messages, the at least one different sender ID comprising a sender ID associated with a country that is different from another country associated with the at least one different sender ID.

18. The system of claim 13, the operations further comprising: receiving a reply to the message service message from the one or more message recipients; ascertaining, from the sender ID, the message originator of the message service message; and causing the reply to be routed to the message originator of the message service message.

19. The system of claim 13, wherein said automatically assigning comprises using a policy-driven approach to determine whether to assign shared numbers or dedicated numbers as the sender ID.

20. The system of claim 13, wherein the sender ID comprises a number that is local to the destination of the message service message.

\* \* \* \* \*